United States Patent [19]

Abel et al.

[11] Patent Number: 5,012,056

[45] Date of Patent: Apr. 30, 1991

[54] CONTROL DEVICE FOR USE IN AN ELECTRICAL SWITCH

[75] Inventors: Thomas Abel; Klaus Hirschfeld, both of Luedenscheid, Fed. Rep. of Germany

[73] Assignee: Firma Leopold Kostal GmbH & Co. KG, Luedenscheid, Fed. Rep. of Germany

[21] Appl. No.: 418,511

[22] Filed: Oct. 10, 1989

[30] Foreign Application Priority Data

Oct. 10, 1988 [DE] Fed. Rep. of Germany ....... 3834390

[51] Int. Cl.$^5$ ............................................ H01H 25/06
[52] U.S. Cl. .................................... 200/519; 200/539; 200/329
[58] Field of Search ............... 200/329, 336, 519, 520, 200/538, 539, 564, 565

[56] References Cited

U.S. PATENT DOCUMENTS 2,095,181  10/1937  Douglas .............................. 200/539
4,528,545   7/1985  Lang ................................... 200/565

FOREIGN PATENT DOCUMENTS 7111751  3/1971  Fed. Rep. of Germany .
2631144  8/1978  Fed. Rep. of Germany .

Primary Examiner—Renee S. Luebke
Attorney, Agent, or Firm—Brooks & Kushman

[57] ABSTRACT

A control device for an electrical switch is suggested, which is composed, among other things, of an actuation element (1) as well as at least one latching pin (3) that is under the effect of a compression spring (2) and a system having at least one latching track (4) interacting with the latching pin (3). In the latching track (4), at least one molded pathway (7) lying inclined to the actuation directions is present, which upon a displacement of the latching pin (3) in one of the actuation directions necessarily produces a simultaneous displacement of the latching pin (3) in the other actuation direction. The control device designed in such a way serves the purpose of realizing the functions of both angular and axial displacement and in addition, of insuring that the electrical switch can only be brought into permissible switching positions by movement of the actuation element (1).

23 Claims, 3 Drawing Sheets

CONTROL DEVICE FOR USE IN AN ELECTRICAL SWITCH

BACKGROUND OF INVENTION

1. Field of Invention

The invention described here is based on a control unit for an electrical switch.

2. Related Art Statement

Control devices of the type with which this invention is concerned make it possible for a user of an electrical switch to purposefully bring it into various switch settings via an actuation element. In addition, control devices of this type have a predetermined system of rest positions, which is perceptible to the user and, via a defined setting of the actuation element, makes perceptible to the user what switch setting the electrical switch is moving into and/or which switch setting the electrical switch is in at any given time.

A control unit for an electrical switch that contains some features of the present invention has been disclosed in DE-GM 71 11 751. In this rotary light switch with an additional setting option in the axial direction, a molded control track is integrated in the switch shaft. Two control elements that are formed as balls, are mounted opposed to each other, are each under the effect of a compression spring, and engage in the control track. In this design, the control track is formed in such a way that during angular or axial displacement of an actuation element, only one displacement of the control elements in an angular or axial direction occurs, exclusively. However, in that version of the control device, in a combined light—fog light—rear fog light switch for automobiles, the electrical switch could be brought into a switching position that has a non-permissible function. This is the case for example, if the electrical switch is in a position in which the fog light and/or fog light-rear fog light function is switched on without the parking light and/or dimmed light functions being switched on at the same time.

In addition, an automobile rotary light switch with an additional axial displacement option for the fog light and rear fog light functions has been disclosed in DE-AS 26 31 144. In this switch, automatic retention in non-permissible switch settings is prevented by an automatic return of the control device to its starting switch setting. However, it is not possible while switching on the fog light and/or fog light-rear fog light function (axial displacement of the actuation element) to automatically switch on the parking light function (angular displacement of the actuation element) and thus to automatically achieve only permissible switch settings. In addition, a separate control device each for the angular and for the axial displacement is necessary, which results in the entire switch being relatively expensive, due to the number of required components and the multiple manufacturing processes involved.

SUMMARY OF INVENTION

The present invention has been created to fulfill the task of creating a control device for an electrical switch through which both the functions of angular as well as axial displacement are realized and by means of which it is guaranteed that the electrical switch can only be brought into permissible switch settings by movement of an actuation element.

In this invention, the task is solved by means of the characteristics described in the main claim.

The advantage in this type of development is that such a control device can be realized with the use of very few components that are simple to manufacture and thus can be produced especially economically. The use of such an electrical switch—controlled by such a control device—is especially simple for the user, because unnecessary multiple actuations due to faulty operations during switching on and/or off are as good as prevented. This contributes in automobiles to alleviating stress in the driver and thus to an increase in traffic safety.

Additional advantageous design variants are given in the sub-claims.

The object according to the invention is elucidated in greater detail by means of the design variants represented in the drawing.

DESCRIPTION OF PREFERRED EMBODIMENTS

Figure 1:
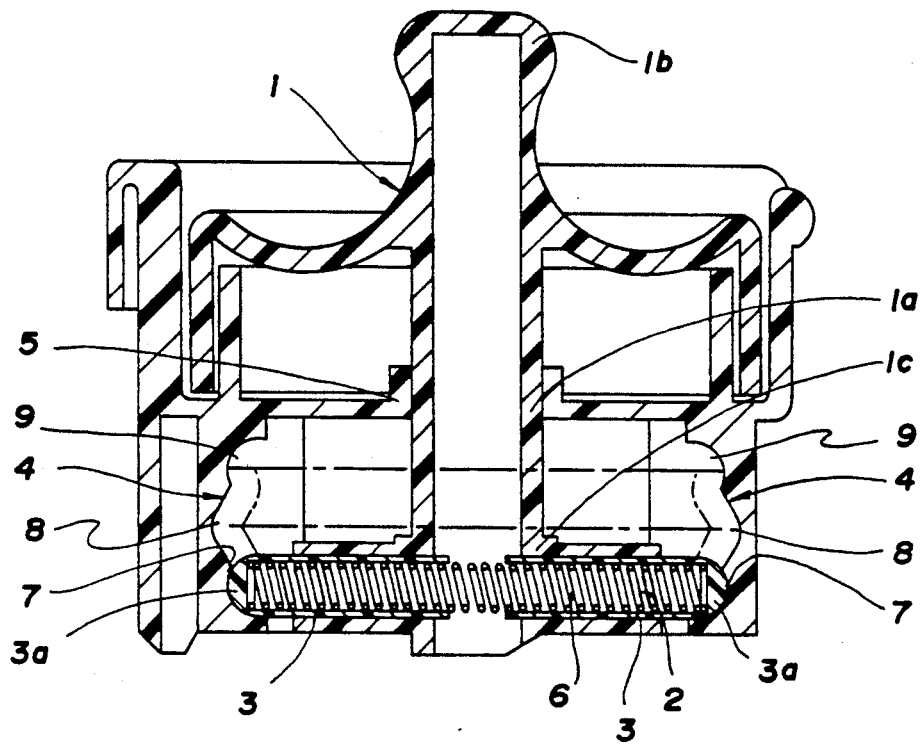
FIG. 1 is an axial cross-sectional view of a control unit of an electrical switch according to the present invention.

As is evident from the drawing, a control unit for an electrical switch basically consists of an actuation element 1 as well as two control elements 3 that are influenced by the actuation element 1 under the effect of a compression spring 2 and two latching tracks 4, mounted diametrically opposed, each of which working together with a latching pin 3.

Figure 2:
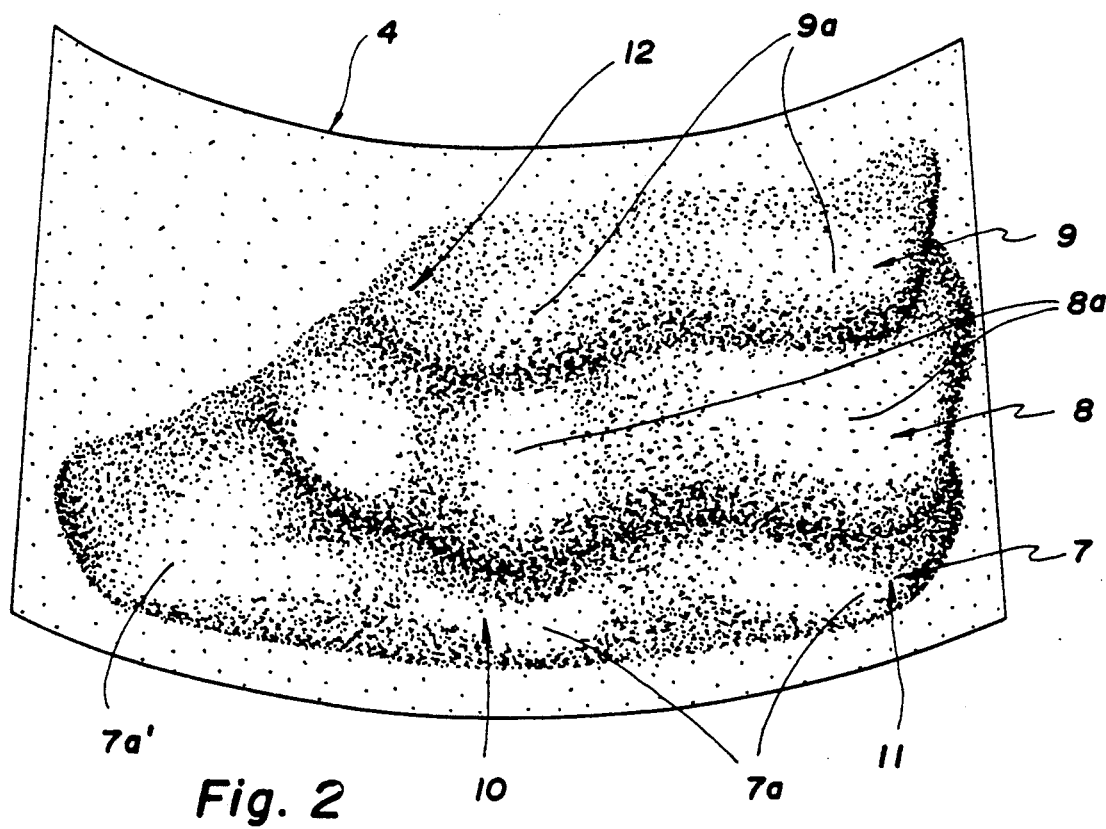
FIG. 2 is a network representation of a latching track system of the control unit.
Figure 3:
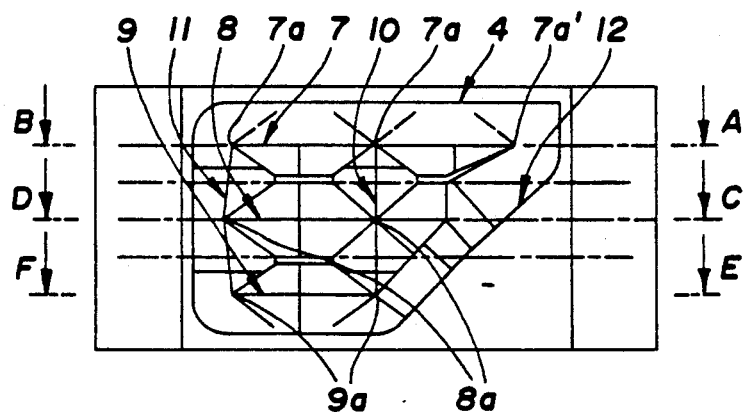
FIG. 3 is a schematic view of the latching track system.
Figure 3A:
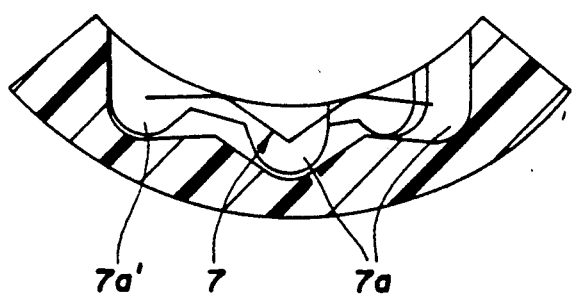
FIG. 3a is a section through the latching track system along the line A-B of FIG. 3.
Figure 3B:
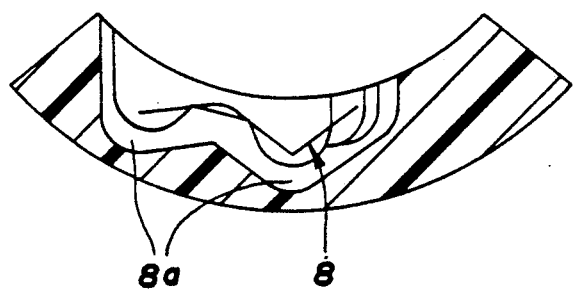
FIG. 3b is a section through the latching track system along the line C-D of FIG. 3.
Figure 3C:
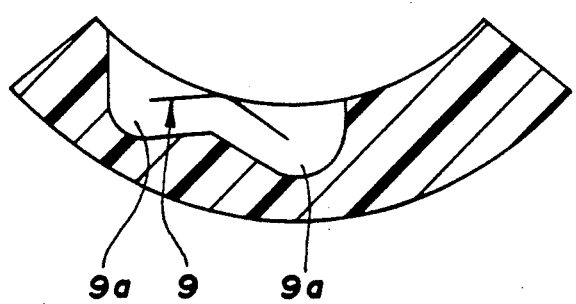
FIG. 3c is a section through the latching track system along the line E-F of FIG. 3.

The actuation element 1 is mounted so that it can be displaced angularly and axially via its axle 1a in the housing 5 of the electrical switch, whereby the one end 1b that is provided for actuation is formed as a rotary knob. The other end 1c of the actuating element 1 is provided with a chamber 6 for accommodation of the latching pins 3 and the compression springs 2. The latching pins 3 are preferably sleeves made out of plastic, which are closed at the ends 3a and are turned towards the latching tracks 4. The compression spring 2 supports itself at both sides on these closed ends 3a of the chamber 6. The area of the closed ends 3a that are engaged with the latching tracks 4 are formed in a half-round shape. As can especially be seen from FIGS. 1, 2 and 3, the latching tracks 4 are molded in as an integral part of the housing 5. Three molded pathways 7, 8, 9 is run circumferentially and are mounted one after the other in the axial direction. In this design, three indented rest positions 7a', 7a, are in each of the molded pathways 7 and in each of molded pathways 8 and 9 there are respectively two indented rest positions 8a and 9a. The second indented rest positions 7a of the molded pathways 7 run circumferentially. The first indented rest positions 8a, 9a of molded pathways 8, 9 likewise run circumferentially. The third indented rest position 7a of molded pathway 7 and the second indented rest positions 8a, 9a of molded pathways 8, 9 are connected via molded pathways 10, 11 that run in an axial direction. In addition, a molded pathway 12 running inclined to the actuation directions of the latching pins 3 is present in each of the latching tracks 4, which connects the first indented rest position 7a' assigned to the starting switch setting of the molded pathway 7 and the first indented rest position 9a of the molded pathway 9 with each other.

The molded pathways 8 extend at one end into the additional molded pathways 12. In addition, the latching tracks 4 are formed in such a way that the latching pins 3 automatically come to rest again in one of the indented rest positions 7a', 7a, 8a, 9a, from any point after each movement of the actuation element 1.

FIG. 1 shows the control device of the combined rotary light switch with two pull settings for the fog light and/or fog light—rear fog light in its initial or starting switch position. Here, the latching pins 3 are located in indented rest positions 7a' of molded pathway 7. If the control device is turned around its axle 1a via the actuation element 1—i.e. displacement angularly—the latching pins 3 come to rest in the indented rest positions 7a of the molded pathway 7 assigned to the parking lights. With further turning of the actuating element 1 around its axle 1a, the latching pins 3 come to rest in the indented rest positions 7a of molded pathway 7 assigned to the dimmer lights. From each of the indented rest positions 7a assigned to the parking lights and/or dimmer lights, the latching pins 3 can, by a pulling motion of the actuating element 1—i.e. a displacement in axial direction—be brought into indented rest positions 8a, 9a of molded pathways 8, 9. If this occurs, starting from indented rest positions 7a, which are assigned to the parking lights, the latching pins 3 will be brought into indented rest positions 8a and/or 9a via the molded pathways 10 running in the axial direction, whereby the fog lights and/or the fog lights—rear fog lights will be switched on in addition to the dimmer lights.

Latching pins 3 can be moved via molded pathways 10 and/or 11 back again into the indented rest positions 7a (parking lights and/or dimmer lights) of the molded pathways 7 by a pushing movement of the actuating element 1—i.e. displacement in an axial direction. The latching pins 3 are then brought into the starting switch setting and/or indented rest positions 7a' by turning back the actuating element 1—i.e. by angular displacement.

If the actuating element 1 is turned back when the latching pins 3 are located in molded pathways 8 or 9, the latching pins 3 come, at the end of these molded pathways 8 or 9, into the additional molded pathway 12 that runs inclined to the actuation directions of latching pins 3 and finally into the starting switch setting and/or indented rest positions 7a'. By means of the additional molded pathway 12, the latching pins 3 are not only displaced angularly, but also necessarily in the axial direction. In this way, not only the parking lights and/or dimmer lights, but also necessarily the fog lights and/or fog lights-rear fog lights are switched off by an actuation of the actuating element angularly.

If the fog lights and/or fog lights-rear fog lights are to be switched on immediately starting from the initial switch setting, the actuating element 1 is displaced by a pulling movement in an axial direction. The latching pins 3 are thereby displaced by additional molded pathway 12 not only in an axial, but also necessarily in an angular direction and come to rest in the first indented rest positions 8a and/or 9a. In this way, the parking lights are switched on simultaneously with the fog lights and/or rear fog lights by an actuation of the actuating element 1 in the axial direction.

The previously described control device in this way effectively prevents the user of an automobile from being able to bring the switch into a nonpermissible switch setting via actuating element 1.

In addition, such a control device effectively prohibits the user from moving the actuating element in an axial direction and angularly at the same time, except where this is explicitly specified by the form of latching track systems 4.

If the latching pins 3 are brought from one indented rest position into another by movement of actuating element 1, the user will be informed of this by a clear increase and/or decrease in the actuating forces. This increase or decrease of the actuating forces is achieved by the combined action of the latching pins 3, the compression spring 2, and the latching track systems 4.

Figure 4:
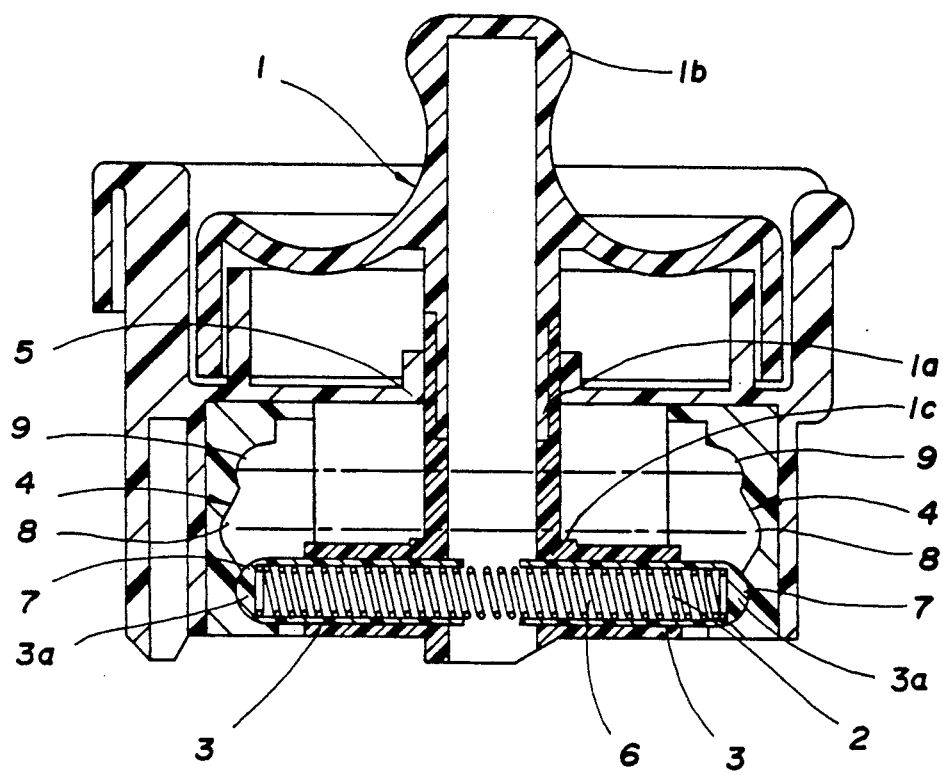
FIG. 4 is an axial cross-sectional view of a control unit of an alternate embodiment of an electrical switch according to the present invention.

Turning back to FIG. 4, it will be apparent that the latching track system 4 is formed separately from the housing 5 of the electrical switch.

What is claimed is:

1. A control device for an electrical switch with an actuation element that is mounted in a housing in such a way that it can be angularly and axially displaced, as well as at least one latching pin which can be influenced by the actuation element and that is likewise mounted in the housing in such a way that the at least one latching pin can be angularly and axially displaced, that is spring loaded, and that has at least one latching track system assigned to it, whereby the at least one latching track system includes latching tracks having molded pathways running in axial and angular directions, through which the at least one latching pin is driven during displacement of the actuation element and whereby the molded pathways each are provided with several indented rest positions assigned to different switch settings, including in at least one of the latching tracks (4), at least one additional molded pathway (12) which runs inclined to the actuation directions of the at least one latching pins (3), which during a displacement of the at least one latching pin (3) in one of the actuation directions necessarily and simultaneously produces a displacement of the at least one latching pin (3) in the other actuation direction.

2. A control device according to claim 1, characterized by the fact that three molded pathways (7, 8, 9) are provided in the latching track system, run generally circumferentially, and lie one behind the other in the axial direction, whereby in the first molded pathway (7) three indented rest positions (7a', 7a) are provided and in each of the two other molded pathways (8, 9), two indented rest positions (8a, 9a) are present and by the fact that, starting from one of the indented rest positions (7a', 7a) of the first molded pathway (7), at least one indented rest position (8a, 9a) of at least one of the two other molded pathways (8, 9) is connected via the additional molded pathway (12) that runs inclined to the actuation directions of the latching pins (3).

3. A control device according to claims 1 or 2, characterized by the fact that one of the indented rest positions (7a') of the first molded pathway (7) is assigned to a starting switch position and the remaining indented rest positions (7a) of the first molded pathway (7) as well as each of the indented rest positions (8a, 9a) of the other molded pathways (8, 9) are assigned to other function switch settings of the electrical switch, the indented rest positions (7a, 8a, 9a) assigned to each of the function switch settings of the electrical switch being arranged to lie one after the other in the axial direction, each being connected via a molded pathway (10, 11) running in the axial direction, the indented rest position assigned to a starting switch setting (7a') of the first molded pathway (7) being connected directly to the first indented rest position (9a) of the third molded pathway (9) via the additional molded pathway (12) running inclined to the actuation directions of the latching pins (3) and the center molded pathway (8) running in an angular direction being extended at one of its ends into the additional molded pathway (12).

4. A control device according to claim 3, characterized by the fact that the latching track system (4) is a component that can be installed separately in the housing (5) of the electrical switch and is made from a suitable wear-resistant plastic.

5. A control device according to claim 3, characterized by the fact that the latching track system (4) is an integral part of the housing (5) of the electrical switch.

6. A control device according to claim 3, characterized by the fact that portions of the latching pins (3) that interact with the latching track system (4) are spherical in shape.

7. A control device according to claim 3, characterized by the fact that in the electrical switch, two latching track systems (4) are mounted diametrically opposed, into each of which one of the at least one latching pins (3) engages.

8. A control device according to claim 3, characterized by the fact that at least one latching track system (4) is present off-axis on the housing (5).

9. A control device according to claims 1 or 2, characterized by the fact that the latching track system (4) is a component that can be installed separately in the housing (5) of the electrical switch and is made from a suitable wear-resistant plastic.

10. A control device according to claim 9, characterized by the fact that portions of the latching pins (3) that interact with the latching track system (4) are spherical in shape.

11. A control device according to claim 9, characterized by the fact that in the electrical switch, two latching track systems (4) are mounted diametrically opposed, into each of which one of the at least one latching pins (3) engages.

12. A control device according to claim 9, characterized by the fact that at least one latching track system (4) is present off-axis on the housing (5).

13. A control device according to claims 1 or 2, characterized by the fact that the latching track system (4) is an integral part of the housing (5) of the electrical switch.

14. A control device according to claim 13, characterized by the fact that portions of the latching pins (3) that interact with the latching track system (4) are spherical in shape.

15. A control device according to claim 13, characterized by the fact that in the electrical switch, two latching track system (4) are mounted diametrically opposed, into each of which one of the at least one latching pins (3) engages.

16. A control device according to claim 13, characterized by the fact that at least one latching track system (4) is present off-axis on the housing (5).

17. A control device according to claims 1 or 2, characterized by the fact that portions of the latching pins (3) that interact with the control link (4) are spherical in shape.

18. A control device according to claim 17, characterized by the fact that the latching track system (4) is an integral part of the housing (5) of the electrical switch.

19. A control device according to claim 17, characterized by the fact that in the electrical switch, two latching track systems (4) are mounted diametrically opposed, into each of which one of the at least one latching pins (3) engage.

20. A control device according to claim 17, characterized by the fact that at least one latching track system (4) is present off-axis on the housing (5).

21. A control device according to claims 1 or 2, characterized by the fact that in the electrical switch, two latching tracks (4) are mounted diametrically opposed, into each of which one of the at least one latching pins (3) engages.

22. A control device according to claim 21, characterized by the fact that at least one latching track system (4) is present off-axis on the housing (5).

23. A control device according to claims 1 or 2, characterized by the fact that at least one latching track of the latching track system (4) is provided off-axis on the housing (5).

* * * * *